United States Patent
O'Sullivan et al.

(10) Patent No.: US 8,055,721 B2
(45) Date of Patent: Nov. 8, 2011

(54) METHOD AND SYSTEM FOR DETECTING AND HANDLING MESSAGE COLLISIONS IN AN INSTANT MESSAGING SYSTEM

(75) Inventors: Patrick Joseph O'Sullivan, Ballsbridge (IE); Liam Harpur, Skerries (IE); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/469,155

(22) Filed: May 20, 2009

(65) Prior Publication Data

US 2010/0299393 A1 Nov. 25, 2010

(51) Int. Cl.
G06F 15/16 (2006.01)

(52) U.S. Cl. ...................................... 709/206; 709/207

(58) Field of Classification Search ........... 709/206–207
See application file for complete search history.

(56) References Cited

U.S. PATENT DOCUMENTS

| | | | |
|---|---|---|---|
| 4,644,348 A | 2/1987 | Gerety | |
| 4,945,471 A * | 7/1990 | Neches | 709/252 |
| 5,619,530 A | 4/1997 | Cadd et al. | |
| 5,740,174 A | 4/1998 | Somer | |
| 5,946,118 A | 8/1999 | Flaherty | |
| 5,966,636 A | 10/1999 | Corrigan et al. | |
| 5,970,415 A | 10/1999 | Sarpola et al. | |
| 6,226,652 B1 | 5/2001 | Percival et al. | |
| 6,535,855 B1 * | 3/2003 | Cahill et al. | 705/346 |
| 7,032,033 B1 | 4/2006 | Ledoux et al. | |
| 7,278,108 B2 * | 10/2007 | Duarte et al. | 715/758 |
| 7,523,164 B2 * | 4/2009 | Kantor et al. | 709/206 |
| 7,895,273 B1 * | 2/2011 | Haldar | 709/206 |
| 2007/0226309 A1 * | 9/2007 | Bell et al. | 709/206 |
| 2009/0254616 A1 * | 10/2009 | Cheung et al. | 709/204 |

* cited by examiner

*Primary Examiner* — Abdullahi Salad
(74) *Attorney, Agent, or Firm* — David A. Dagg

(57) ABSTRACT

Collisions are detected between multiple instant messages that are sent to a given user at the same time. In response to detecting a collision, the sending users are put into a real-time, on-line negotiation that enables the sending users to determine among themselves whose instant message will be delivered next to the receiving user. This allows the sending users to make a determination of which message is most important based on their relative needs at the time. A collaborative communication session, such as a group chat, is initiated for the negotiating sending users so that they can exchange information regarding the purposes of their messages. Based on the results of this on-line negotiation between message senders, a limited number (e.g. one) of the colliding messages are next delivered to the receiving user.

16 Claims, 5 Drawing Sheets

METHOD AND SYSTEM FOR DETECTING AND HANDLING MESSAGE COLLISIONS IN AN INSTANT MESSAGING SYSTEM

FIELD OF THE INVENTION

The present invention relates generally to instant messaging systems, and more specifically to a method and system for detecting and handling message collisions in an instant messaging system.

BACKGROUND OF THE INVENTION

As it is generally known, instant messaging, also sometimes referred to as "IM" or "chat", is a form of real-time communication between two or more people primarily based on typed text. The text and/or other content is conveyed between participants via devices connected over one or more communication networks, such as the Internet. Instant messaging is generally considered to be a synchronous form of communication, in that messages are conveyed immediately, in real-time, between instant messaging session participants that are simultaneously on-line and logged into the instant messaging application. Instant messaging systems have traditionally featured immediate receipt of message delivery confirmation or other status by a message sender. These characteristics stand in contrast to traditional asynchronous communication systems, such as electronic mail, which typically provide some type of store and forward message delivery protocol operating independently from the online status of message recipients. However, some existing instant messaging systems also allow sending instant messages to people that are not currently logged on, as well as saving of instant messaging sessions for future reference.

In today's collaborative work environments, in which instant messaging is increasingly used and relied on for everyday communications, it is often possible for a single user to be interrupted by multiple instant messages that are received at the same time. For example, a user may log into his or her instant messaging client and immediately four or five people will see that they are present online and want to send him or her an instant message. This can be difficult to handle for the receiver of the messages, since they must manually manage the "collision" of the multiple messages sent to them at the same time from multiple senders. Not only does the message recipient have to deal with the potential confusion that may arise from concurrently communicating with multiple parties, but they may also feel under pressure to respond to all of the sending users quickly. The resulting "rushed" service can lead to mistakes on the part of the initial message recipient, and over time can adversely affect their reputation and/or their business effectiveness.

For the above reasons and others, it would be desirable to have an automated solution that prevents users from simultaneously receiving large numbers of instant messages. The solution should preferably operate to determine which instant message(s) should next be delivered to a receiving user based on a real-time determination of prioritization made by the sending users and that accordingly accurately reflects the immediate needs of the sending users.

SUMMARY OF THE INVENTION

To address the above described and other shortcomings of previous approaches, a solution is disclosed that detects and handles a "collision" between multiple instant messages that are to be delivered to a given user. The disclosed system operates to detect that multiple sending users are sending instant messages at the same time to a receiving user. This situation is determined to be a "collision" between the multiple instant messages being sent. In response to detecting a collision between multiple instant messages being sent to a receiving user, the disclosed system performs actions that limit the number of instant messages that are delivered at once. These limiting actions include putting the sending users into one or more real time, on-line negotiations that enable the sending users to determine among themselves whose instant message will be delivered next to the receiving user. This allows the sending users to make a determination of which message is most important based on their relative needs at the time. Specifically, a collaborative communication session, such as a group chat, is initiated for one or more groups of negotiating sending users so that they can exchange information regarding the purposes of their messages. Based on the results of this on-line negotiation between message senders, the disclosed system operates to deliver a limited number (e.g. one) of the messages to the receiving user at the same time.

In one embodiment, users that determine during the on-line negotiation that their messages have a relatively low priority simply do not send their messages (e.g. by not clicking "Send" or the like), while the user or users that determine that their messages are relatively important do send their messages (e.g. by clicking "Send" or the like), possibly in an order they expressly negotiate during the on-line negotiation. The on-line negotiation may continue until the sending users have all sent their respective messages to the receiving user.

In another embodiment, a user interface is generated to each sending user during the on-line negotiation that includes one or more user interface objects through which an indication can be entered as to the relative importance of their message. For example, graphical buttons or the like may be displayed that allow each user to indicate the relative priority of their message with regard to the other messages in the negotiation. Such user interface objects may include a user interface object that allows a user to enter an indication that their message has a relatively high priority, and that it should accordingly be delivered immediately. Another user interface object may be generated that allows a user to enter an indication that their message is relatively low priority, and should be queued for delivery at some time after the higher priority messages have been responded to. Another user interface object may be generated that allows a user to enter an indication that their message is relatively low priority, and that it should be withdrawn and not delivered at the current time, for example so that they can manually resend it at a later time.

The disclosed system may further be embodied to apply external prioritization data (e.g. explicit message delivery prioritization rules) on an individual receiving user basis and/or on a group or business unit basis. Such prioritization data may, for example, prioritize colliding messages based on the sending user and/or content of each message, and may further reflect business organization structures or user groupings found in external databases or the like.

The disclosed system advantageously prevents a receiving user from receiving a potentially unmanageable number of instant messages simultaneously. The disclosed system also operates to determine which instant message(s) should next be delivered to a receiving user in a way that accurately reflects the current needs of the sending users.

BRIEF DESCRIPTION OF THE DRAWINGS

In order to facilitate a fuller understanding of the present invention, reference is now made to the appended drawings.

DETAILED DESCRIPTION OF EXEMPLARY EMBODIMENTS

Figure 1:
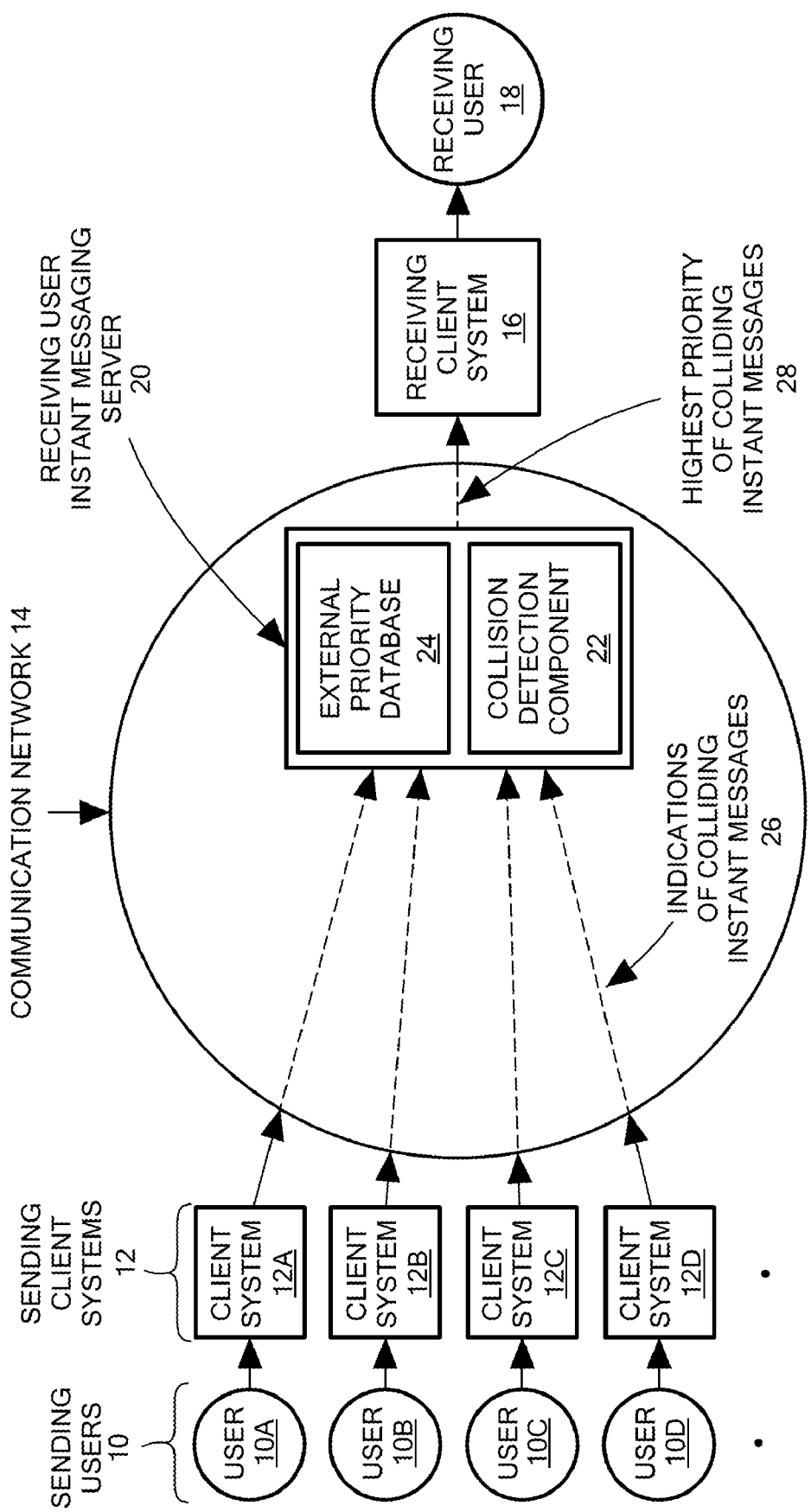
FIG. 1 is a block diagram showing hardware and/or software components in an illustrative embodiment of the disclosed system.

FIG. 1 is a block diagram showing hardware and/or software components in an illustrative embodiment of the disclosed system. As shown in FIG. 1, each one of Sending Users 10 (e.g. 10A, 10B, 10C, etc.) is associated with a corresponding one of the Sending Client Systems 12 (e.g. 12A, 12B, 12C, etc.). The Sending Client Systems 12 are each communicably connected to a Communication Network 14. The Communication Network 14 is further communicatively connected to a Receiving Client System 16 associated with a Receiving User 18. The Communication Network 14 includes and/or is communicatively connected to a number of server systems and networking devices. The Communication Network 14 of FIG. 1 is shown including a Receiving User Instant Messaging Server 20 that includes a Collision Detection Component 22 and an External Priority Database 24.

During operation of the components shown in FIG. 1, instant messaging may be performed over the Communication Network 14 between users of client systems that are connected to the Communication Network 1, such as between the Sending Users 10 and the Receiving User 18. In the illustrative embodiment of FIG. 1, instant messaging is supported for the Receiving User 18 at least in part through operation of at least one instant messaging application at least partly contained in and/or running on the Receiving User Instant Messaging Server 20, and/or at least partly contained in and/or running on the client systems 12 and 16. The Collision Detection Component 22 operates to detect when multiple instant messages are simultaneously being sent to the Receiving User 18. When the Collision Detection Component 22 detects that multiple instant messages are simultaneously being sent to the Receiving User 18, the Collision Detection Component 22 determines that those simultaneously sent instant messages are a collision of instant messages, and automatically initiates and provides at least one online negotiation between the senders of the colliding instant messages to obtain at least one indication of which one of the colliding instant messages is to be sent next to the Receiving User 18.

For example, as shown in FIG. 1, the Collision Detection Component 22 receives Indications of Colliding Instant Messages 26 indicating that sending users User 10A, User 10B, User 10C and User 10D are each simultaneously sending or have simultaneously each sent instant messages through their respective Sending Client Systems 12 to the Receiving User 18. For example, the Indications of Colliding Instant Messages 26 may consist of indications that each one of sending users User 10A, User 10B, User 10C and User 10D has begun composing (e.g. typing) an instant message that is to be sent to Receiving User 18.

Alternatively, the Indications of Colliding Instant Messages 26 may consist of actual instant messages sent by each of the sending users User 10A, User 10B, User 10C and User 10D within a configurable collision time period. In an embodiment that operates to detect collisions between instant messages that are sent within a collision time period, the length of the collision time period may be a configurable parameter, settable by either the Receiving User 18 and/or a system administrator or the like. The collision time period may, for example, begin (i.e. be reset) each time an instant message is delivered to the Receiving User 18.

The online negotiation provided by the Collision Detection Component 22 may, for example, be a group chat (i.e. group instant messaging session) that is automatically started by the Collision Detection Component 22, and having as participants each of the sending users (e.g. User 10A, User 10B, User 10C and User 10D) of the colliding instant messages. During the online negotiation, each participants can post messages that are seen by all participants in real-time. The online negotiation allows the sending users to discuss the importance of their messages and/or their specific needs with regard to contacting the receiving user (e.g. Receiving User 18)). Based on the information exchanged through the online negotiation, the sending users of the colliding instant messages can then conveniently determine among themselves which of the colliding instant messages has the highest relative priority, and accordingly which of their messages should be the next instant message delivered to the receiving user.

In a first embodiment, after the sending users in the online negotiation have determined which of the colliding instant messages should be the next instant message delivered to the receiving user, the sending user for that next instant message must expressly cause the message to be sent, by completing composition of the message if necessary, and then expressly issuing a send command for the message, e.g. by clicking on a "Send" button, hitting return in the message entry field, or through some other user interface mechanism. The instant message is then delivered by the instant messaging application to the receiving user.

In an alternative embodiment, the disclosed system provides each participant in the online negotiation with a number of user interface mechanisms through which they can assign a relative priority to their message. The disclosed system then determines a next message to be delivered based on the message priorities entered by the message senders. In such an alternative embodiment, after the sending users have determined which one of the colliding instant messages should be the next instant message delivered, they can each select the one of the provided user interface mechanisms (e.g. graphical buttons, etc.) that will assign an appropriate priority to their respective message. For example, graphical buttons may be included in the user interfaces displayed to each participant in the online negotiation that allow the sending users to indicate that their message is "high priority", "low priority", and/or that their message should be removed or cancelled for the time being and they will determine if and when they will attempt to send it again at a later time. In such an embodiment, the disclosed system operates to deliver the one of the colliding instant messages indicated to be "high priority" to the receiving user prior to delivery of any of the colliding instant messages indicated to be "low priority". If more than one of the colliding instant messages is indicated by its respective sending user to be "high priority", then the disclosed system may operate to initiate another online negotiation including as participants the senders of the "high priority" messages to determine which of the "high priority" messages is to be the next message delivered to the receiving user. Alternatively, the disclosed system may operate to apply another technique to determine an order in which the messages designated "high priority" by their senders are to be delivered to the receiving user. For example, the Collision Detection Component 22 may determine an order of delivery for a set of "high priority" messages based on message prioritization rules contained in the External Priority Database 24 and applied against message sender identities and/or content of each of the "high priority" messages.

After delivery of one of the colliding instant messages based on the outcome of the online negotiation between the message senders, the disclosed system may operate to delay delivery of another of the colliding instant messages to the receiving user until the receiving user has had an adequate opportunity to respond. For example, the disclosed system may delay delivery of another of the colliding instant messages to the receiving user until after a configurable time period expires, or until after detecting that the receiving user has replied to the previous message. Alternatively, the disclosed system may operate to delay delivery of another one of the colliding instant messages until another one of the sending users issues a send command for the other message (e.g. clicks on "Send" or the like). In this situation, a participant in the online negotiation whose colliding message has been delivered can use the online negotiation to inform the other participants when they have finished their communication with the receiving user, thus indicating that a next message can be sent.

The determination by the Collision Detection Component 22 of a next one of the colliding instant messages to be delivered to the Receiving User 18 may be responsive to the contents of the External Priority Database 24 in a variety of different ways. For example, the External Priority Database 24 may include prioritization data indicating which of the Sending Users 10 has relatively high priority with regard to communicating with Receiving User 18. In such a case, the Collision Detection Component 22 may operate to select a next message to be delivered to Receiving User 18 from the set of colliding messages based at least in part on the identities of the senders of each of the colliding messages and the contents of the External Priority Database 24. Similarly, the External Priority Database 24 may include prioritization data indicating specific subject matter and/or topics that have relatively high priority with regard to communications with Receiving User 18. In such a case, the Collision Detection Component 22 may operate to select a next message to be delivered to Receiving User 18 from the set of colliding messages based at least in part on the contents and/or subject of each of the colliding messages and the External Priority Database 24.

The initiation by the Collision Detection Component 22 of one or more online negotiations upon detecting colliding instant messages to be delivered to the Receiving User 18 may also be responsive to the contents of the External Priority Database 24. For example, the External Priority Database 24 may describe group membership and/or business organization personal hierarchies with regard to the Sending Users 10 and/or Receiving User 18. In such an embodiment, the Collision Detection Component 22 may operate to initiate separate online negotiations for sending users belonging to different groups defined in the External Priority Database 24. For example, a first online negotiation might be initiated to include as participants those sending users of colliding messages belonging to a first group, a second online negotiation initiated to include as participants those sending users of colliding messages belonging to a second group, etc. The Collision Detection Component 22 would then determine indications of a next message to be sent from each of the group-based online negotiations, and prioritize among those group-specific highest priority messages, for example based on group prioritizations also contained in the External Priority Database 24. For example if communications from Group A were indicated as having priority over communications from Group B, then the colliding message determined to be highest priority in the Group A negotiation would be delivered to the receiving user prior to the colliding message determined to be highest priority in the Group B negotiation, and so on. Multiple online negotiations may similarly be organized by the disclosed system based on subject matter of the colliding messages, so that those of the colliding messages related to a first topic result in their respective sending users being placed into a first online negotiation, while sending users of those colliding messages related to a second topic are placed into a second online negotiation, and so on. The next messages to be sent from such topic-specific online negotiations would then be prioritized for sequential delivery to the receiving user by the Collision Detection Component 22, for example based on topic prioritizations also found in the External Priority Database 24.

Other aspects of the operation of the components shown in the illustrative embodiment of FIG. 1 and other embodiments are described below.

The client systems 12 and 16 of FIG. 1 may be any specific type of computer systems and/or intelligent electronic devices, such as a desktop, laptop, or palmtop computer systems, and/or personal digital assistants, cell phones, or other electronic devices. The Client Systems 10 and 12 include or control display devices capable of displaying a graphical user interface to a respective local user, such as a liquid crystal display (LCD), cathode ray tube (CRT), interferometric modulator display (IMOD), light emitting diode (LED), or the like.

Those skilled in the art will further recognize that the Collision Detection Component 22 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware. Similarly, those skilled in the art will recognize that the External Priority Database 24 may consist or include any specific type of database technology, such as, for example, an LDAP (Lightweight Directory Access Protocol) based directory or the like. Moreover, while FIG. 1 shows an embodiment in which structure and operation of the present invention is at least significantly provided through a server based component such as the Collision Detection Component 221 (i.e. an embodiment primarily based on one or more centralized server systems), the disclosed system is not limited to such a design. Alternatively, the disclosed system may be embodied such that some or all of the operations described as being performed by the Collision Detection Component 22 are performed on or by one or more of the client systems 12 and/or 16 (i.e. a peer to peer or client-based embodiment), and/or on or by one or more other server computer systems located in or communicative with the Communication Network 14 and associated with one or more of the Sending Client Systems 12.

Those skilled in the art will further recognize that the client systems 12 and 16, and the server system 20 of FIG. 1 may each include one or more processors, and program and data storage, such as memory, for storing program code executable on such processors, as well as various input/output devices and/or interfaces. In the example of FIG. 1, the client systems 12 and 16 and server system 20 are interconnected for purposes of illustration by Communication Network 14 (e.g. the Internet, a Local Area Network, etc.) through one or more of such input/output devices or interfaces, and through which may further be provided communication to a number of other client systems and/or remote server systems.

While for purposes of concise illustration a limited number of users, client and server systems are shown in FIG. 1, the disclosed system is not limited to any specific number of users, client and/or server systems.

Figure 2:
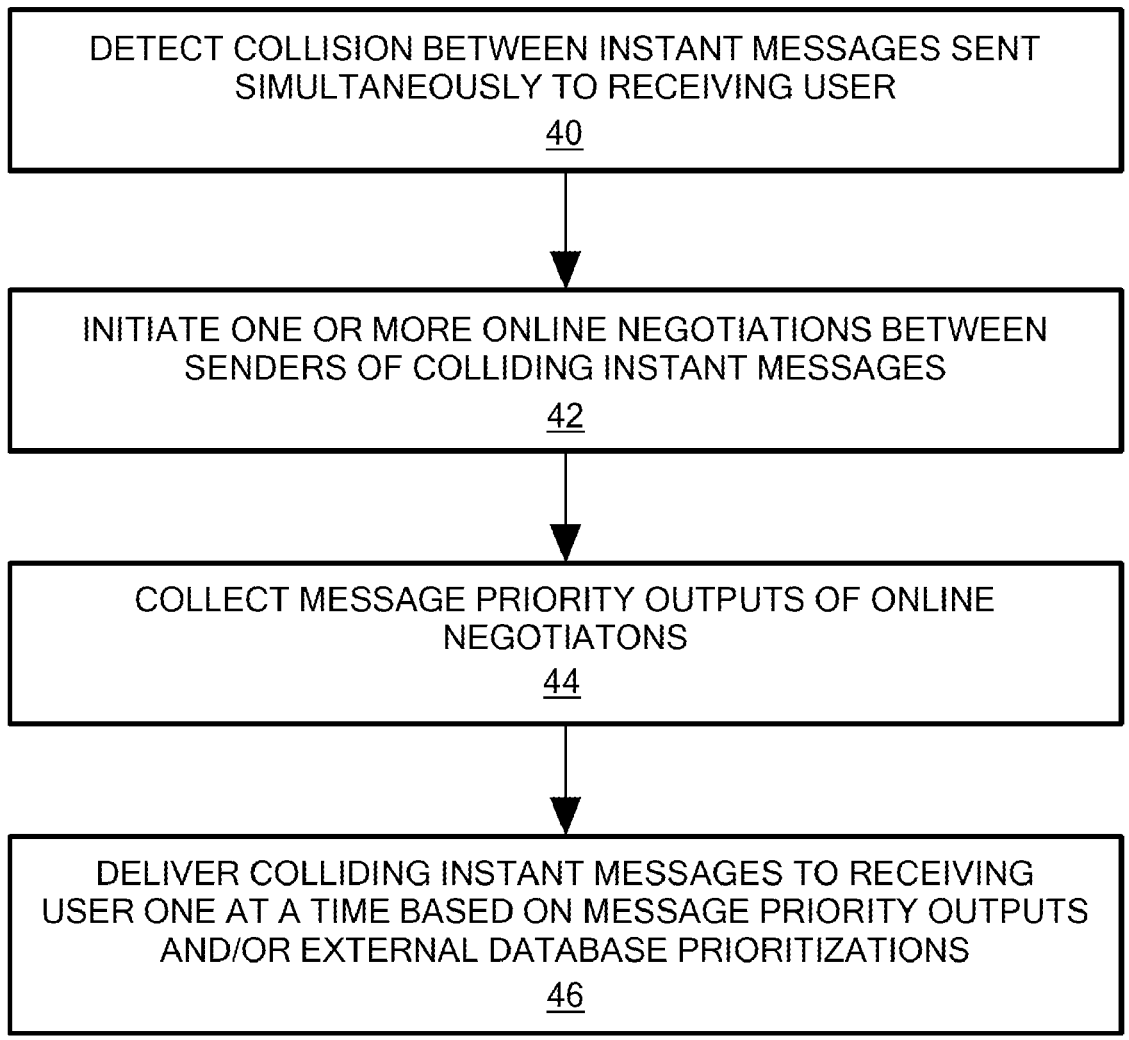
FIG. 2 is a flow chart showing steps performed during operation of an illustrative embodiment of the disclosed system.

FIG. 2 is a flow chart showing steps performed during operation of an illustrative embodiment of the disclosed system. At step 40, the disclosed system operates to detect a collision between multiple instant messages being sent to a receiving user. The detection at step 40 may, for example, be responsive to detecting that multiple sending users have all begun composing instant messages to be sent to the receiving user. Alternatively, the detection at step 40 may be responsive to detecting that multiple instant messages have been sent to the receiving user within a collision window time period. In an embodiment that operates responsive to detecting that multiple instant messages have been sent to the receiving user within a collision window time period, the disclosed system operates to delay delivery of any of the colliding instant messages until a next message to be delivered is later automatically determined based on the output(s) of one or more online negotiations between senders of the colliding messages, as further described below. In this type of embodiment colliding messages may, for example, be queued up in an intermediate or receiving system prior to delivery of a single one of the colliding messages to the receiving user as described below.

The disclosed system may be embodied such that a threshold minimum number of colliding instant messages must be exceeded before an online negotiation is triggered. The threshold minimum may be a configurable parameter. In the event that multiple messages are sent to a receiving user at the same time, but the minimum threshold is not exceeded, the disclosed system may be embodied or configured such that all the messages are delivered at the same time to the receiving user, or the delivery of the colliding messages is serialized based on some predetermined criteria.

At step 42, the disclosed system initiates one or more online negotiation sessions (e.g. group chat sessions) having as participants the sending users of the colliding instant messages detected at step 40. The determination of whether only one or multiple online negotiations are started at step 42 may be a configurable parameter or setting, and/or may be responsive to external prioritization data, e.g. External Priority Database 24 (FIG. 1). Separate online negotiations may be initiated based on common group memberships of the sending users, such that sending users associated with the same group are made participants in their own separate online negotiation, and/or based on message subject matter, such that sending users for messages concerning a given subject or topic are participants in their own separate online negotiation. For example, if a first subset of sending users were determined to be associated with a first business organization or group, and a second subset of sending users were determined to be associated with a second business organization or group, then one online negotiation would be automatically started having the first subset of sending users as participants, and a another separate online negotiation would be automatically started having the second subset of sending users as participants. In an example of operation of an embodiment or configuration using subject matter based online negotiations, a first online negotiation would be automatically started having as participants those sending users of messages related to a first topic, and a second online negotiation would be automatically started having as participants those sending users of messages related to a second topic, etc.

Online negotiation groups may also be determined based on social network criteria. For example, a relatively high priority online negotiation may be formed at step 42 having as participants all of those sending users that are designated "friends" or the like of the receiving user within a social networking application, for example as indicated in the External Priority Database 24. At step 44, the disclosed system collects message priority outputs from the online negotiation or negotiations initiated at step 42. Message priority outputs may, for example, consist of or include an indication that one of the sending users has selected a user interface object requesting that their message be sent to the receiving user (e.g. has clicked on "Send" or the like) after consulting with the other sending users in the online negotiation. Alternatively, message priority outputs may, for example, consist of or include message prioritizations based on voting performed by participants in the online negotiation through their respective online negotiation user interfaces. In another example of an alternative embodiment or configuration, specific message priorities may be selected by sending users through their respective online negotiation user interfaces, to be associated with their respective messages (e.g. "high priority", "low priority", "cancel message", etc.).

The system administrator and/or the receiving user may further configure system parameters such that messages selected for next delivery by online negotiations made up of sending users belonging to certain groups are given higher priority for delivery than messages selected in negotiations made up of users from other groups. For example, the receiving user may configure the disclosed system such that a message or messages selected for next delivery (e.g. given relatively high priority) in an online negotiation made up of sending users belonging to a group consisting of online social network "friends" of the receiving user are given priority over a message or messages selected for next delivery in an online negotiation made up of sending users belonging to another group. e.g. a group consisting of work colleagues.

At step 46, the disclosed system delivers the colliding instant messages to the receiving user one at a time, based on the message priority outputs of the online negotiation(s) collected at step 44, and/or potentially also based at least in part on external prioritization information. Various embodiments may provide for pre-defined rules to be applied in step 44 to select a delivery order to be applied across multiple messages determined to be high priority during the online negotiation(s) between the sending users. For example, such a delivery order might be based on FIFO (First In First Out), sending user seniority, relative closeness of the sending user to the receiving user within an online social network, and/or in response to externally determined temporal constraints such as an important level of an associated sending user as determined based on the sending user's status as an important attendee for an impending meeting as determined from the receiving user's calendaring and scheduling application or the like, or based on some other specific type of prioritization information, rule or policy.

Similarly, if the result of the online negotiation indicates a single one of the colliding messages that has a high priority (i.e. is the next message to be delivered to the receiving user), embodiments or configurations of the disclosed system may use various specific techniques to determine at step 46 an order of delivery for the remaining colliding messages (i.e. the low priority messages). For example, a remaining message from the most senior sending user in the business organization hierarchy, or from the sending user most closely related to the receiving user within an online social network, may be selected to be sent next to the receiving user.

In some situations it may be the case that a sending user goes offline before they complete the sending of their message. In one embodiment, when a determination is made by the disclosed system that the sending user for a highest priority colliding message is no longer online to send their message when the message is to be delivered at step 46 (e.g. their online status has changed to "away"), a failover online negotiation or automatic selection is initiated to determine or select another one of the colliding messages. For example, where more than one of the colliding messages were determined to be high priority, if the sending user for the first one of the high priority messages is determined to be offline at step 46, then an alternative one of the high priority messages is selected for delivery to the receiving user, such as the first sent of the remaining high priority messages.

The disclosed system may also enforce a policy at step 46 that only delivers instant messages after the previously delivered message or messages have or are likely to have been processed by the receiving user. For example, the disclosed system may be embodied and/or configured such that a next one of the colliding instant messages is only delivered to the receiving user after the receiving user has replied to the previously delivered one of the colliding instant messages. Alternatively, the disclosed system may be embodied and/or configured to deliver a next one of the colliding instant messages only when the sending user for the next message indicates that it should be sent (e.g. clicks "Send" or the like). In another alternative embodiment or configuration, the disclosed system may delay delivery of a next one of the colliding instant messages until a period of time expires after an indication is received that the receiving user has read the previous message.

Figure 3:
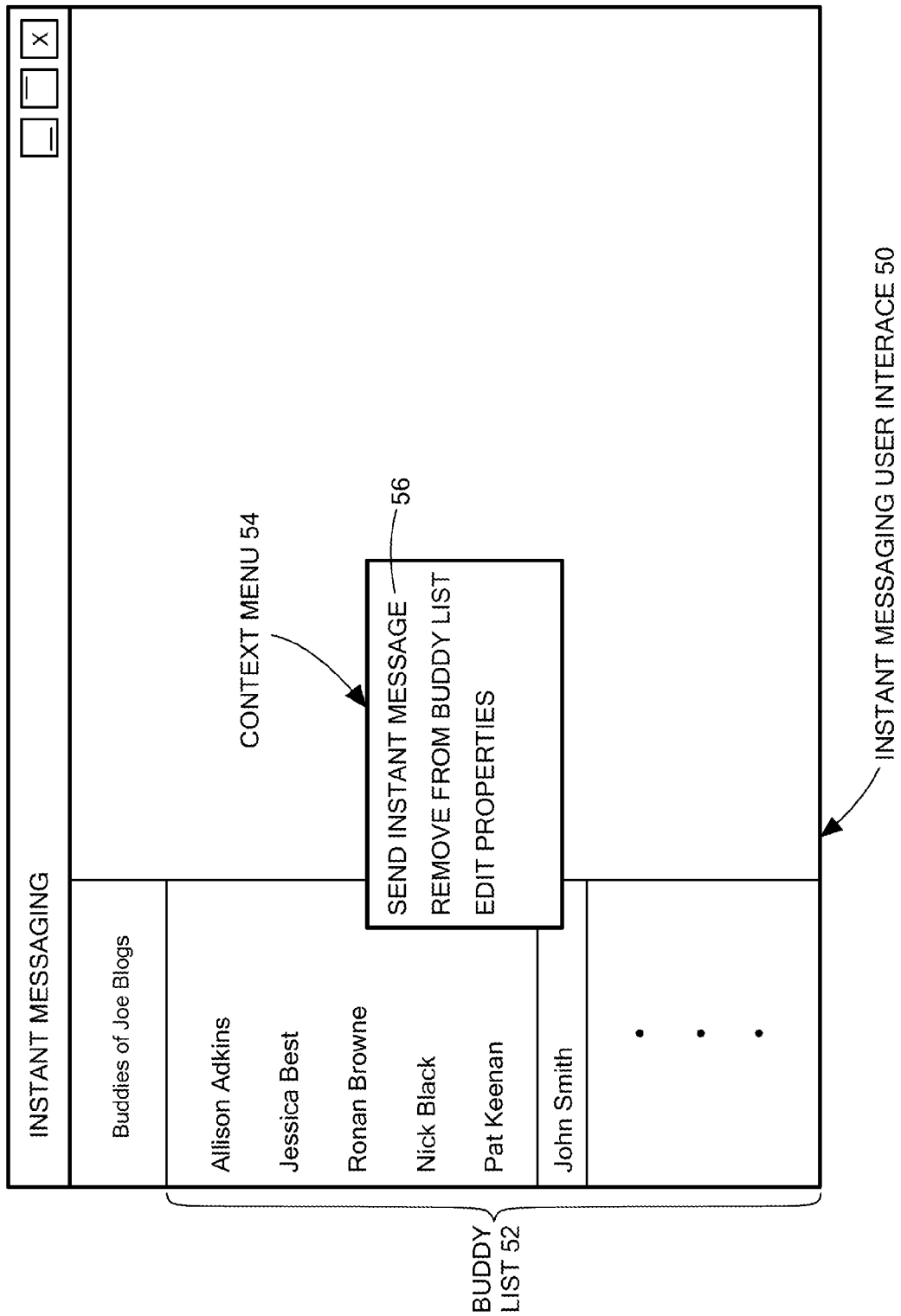
FIG. 3 is a simplified screen shot showing an example of a user interface for initiating the creation and/or sending of an instant message to be sent from a sending user to a remote receiving user in an illustrative embodiment of the disclosed system.

FIG. 3 is a simplified screen shot showing an example of a user interface for initiating the creation of an instant message to be sent from a sending user to a remote receiving user in an illustrative embodiment of the disclosed system. As shown in FIG. 3, the Instant Messaging User Interface 50 includes a Buddy List 52, from which the local user has selected "John Smith" (i.e. clicked on or hovered the cursor over the entry in the Buddy List 52 for "John Smith"). As also shown in FIG. 3, a Context Menu 54 has been generated in response to the local user performing a right click operation with the mouse after selecting the buddy list entry for "John Smith". When the user selects the menu item 56 "Send Instant Message" from the context menu 54, an embodiment of the disclosed system detects that the user is preparing to send an instant message to receiving user "John Smith". Accordingly, user selection of the menu item 56 from the menu 54 is an example of one of the Indications of Colliding Instant Messages 26 shown in FIG. 1. The disclosed system is not limited to such an embodiment, however, and other embodiments/configurations may use various other techniques for determining that one or more instant messages to a receiving user are being simultaneously sent, and are therefore a collision.

Figure 4:
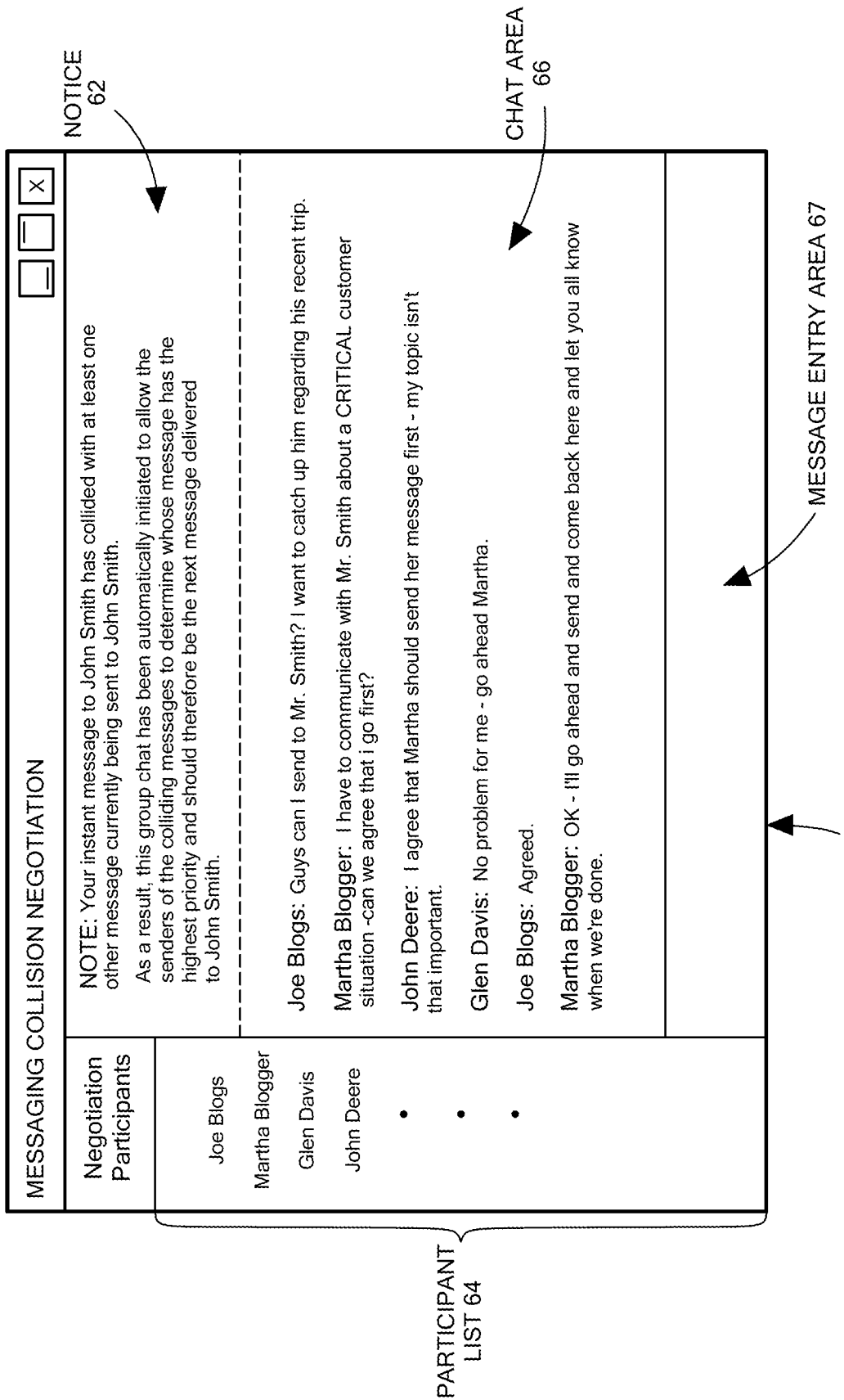
FIG. 4 is a simplified screen shot showing a first example of a user interface for an online negotiation among a group of sending users of colliding instant messages in an illustrative embodiment of the disclosed system.

FIG. 4 is a simplified screen shot showing a first example of a user interface for an online negotiation between sending users of colliding instant messages in an illustrative embodiment of the disclosed system. As shown in FIG. 4, an Instant Message Collision Negotiation User Interface 60 includes a Participant List 64 listing the sending users of the colliding instant messages causing the online negotiation. The Instant Message Collision Negotiation User Interface 60 is displayed to each of the participants in the online negotiation.

The Instant Message Collision Negotiation User Interface 60 further includes a Notice 62 informing each of the participants that a message they are composing or have previously sent has collided within one or more messages being sent by others to the same receiving user. The Notice 62 may further include other information regarding the availability of the receiving user, such as an indication that the present time is a time at which collisions between messages sent to the receiving user are often detected with regard to the receiving user, and/or suggested times to try again when collisions between messages sent to the receiving user have been detected less often.

The Instant Message Collision Negotiation User Interface 60 further includes a Chat Area 66 within which are posted messages entered by participants in the online negotiation are displayed to all participants. A Message Entry Area 67 allows the local user to enter new messages to be posted for viewing by all online negotiation participants in the Chat Area 66.

As shown in the example of FIG. 4, the participants in the online negotiation exchange messages that enable them to determine which of the colliding instant messages should be delivered next to the receiving user John Smith. The online negotiation shown in FIG. 4 results in a determination by the participants that the instant message sent by Martha Blogger is the most important of the colliding messages, and accordingly Martha Blogger states that she will send her message and then come back to the online negotiation to let the other participants know that she is done communicating with John Smith. For example, Martha Blogger will then go back to her message entry user interface or window associated with her message to be sent to John Smith, and expressly indicate that her message to John Smith should be sent (e.g. by clicking on a "Send" button, hitting return at the end of the text of the message, etc.). The disclosed system will detect that Martha Blogger has entered the indication that her message should be sent, and that output of the online negotiation causes the disclosed system to deliver Martha Blogger's message to John Smith next. Similarly, when Martha Blogger returns to the online negotiation to inform the other participants that she is done communicating with John Smith, another one of the participants will be determined to be the next sender, and that participant will enter an indication that their message should next be sent to John Smith.

While in FIG. 4 the Participant List 64 displays the names of the online negotiation participants, the disclosed system may alternatively be embodied and/or configured such that only the While they can see each others requests and negotiate amongst themselves, they can only an allowed attribute of one or more of the participants is viewable by the other participants. Such an allowed viewable participant attribute may, for example, consist of the organizational rank or position of the associated participant.

Figure 5:
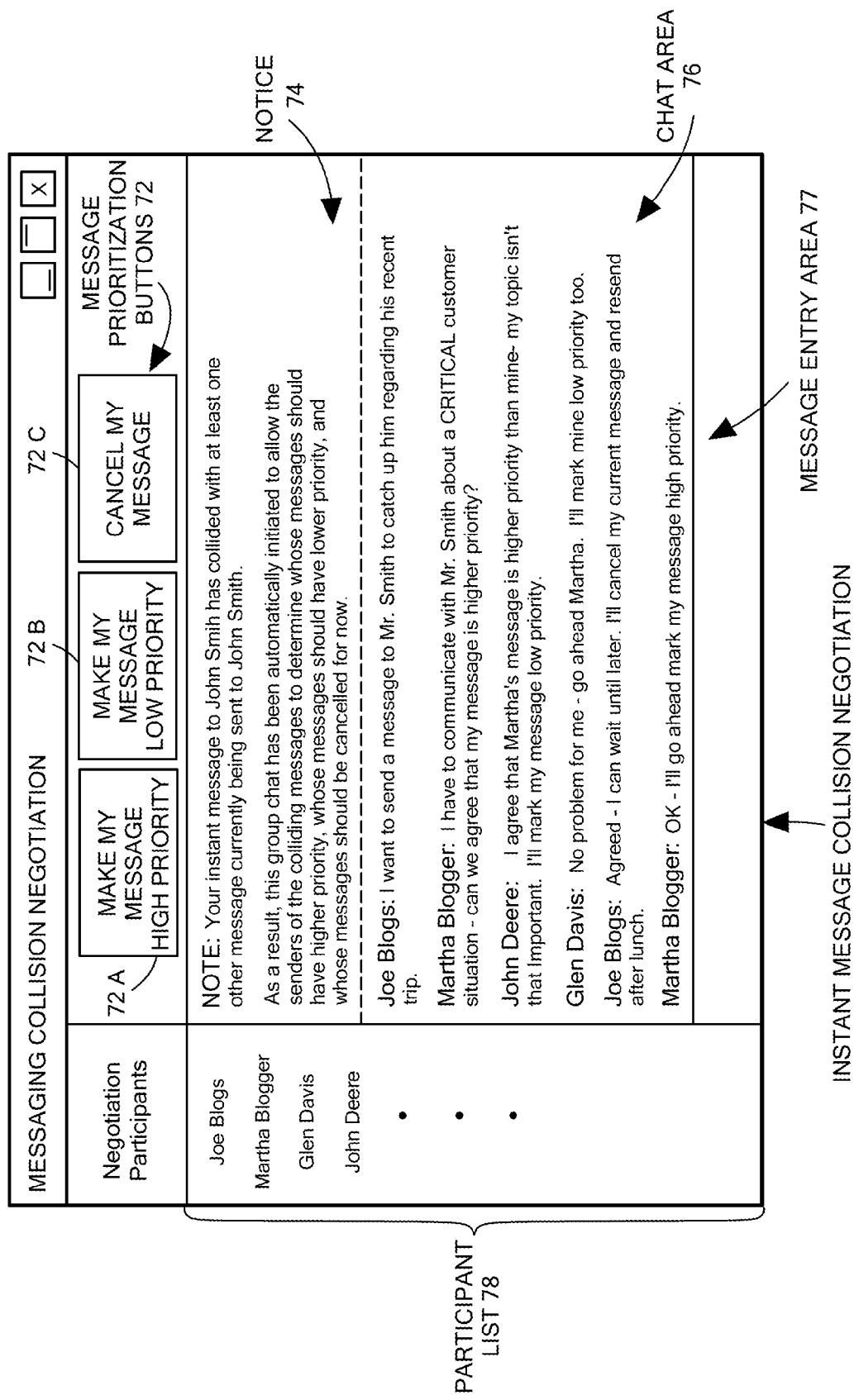
FIG. 5 is a simplified screen shot showing a second example of a user interface for initiating an online negotiation between a group of sending users of colliding instant messages in an illustrative embodiment of the disclosed system.

FIG. 5 is a simplified screen shot showing a second example of a user interface for initiating an online negotiation between sending users of colliding instant messages in an illustrative embodiment of the disclosed system. As shown in FIG. 5, an Instant Message Collision Negotiation User Interface 70 includes a Participant List 78 listing the sending users of the colliding instant messages causing the online negotiation. The Instant Message Collision Negotiation User Interface 70 is displayed to each of the participants in the online negotiation.

The Instant Message Collision Negotiation User Interface 70 further includes a Notice 74 informing each of the participants that a message they are composing or have previously sent has collided within one or more messages sent by others to the same receiving user. The Instant Message Collision Negotiation User Interface 70 further includes a Chat Area 76 within which are posted messages entered by participants in the online negotiation are displayed to all participants. A Message Entry Area 77 allows the local user to enter new messages to be posted for viewing by all online negotiation participants in the Chat Area 76.

Message Prioritization Buttons 72 allow each participant to associate a priority level with their respective messages in the set of colliding messages. In the illustrative embodiment of FIG. 5, a user can 1) click on the graphical button 72A to associate a high priority with their message, 2) click on the graphical button 72B to associate a low priority with their message, or 3) click on the graphical button 72C to cancel their message.

As shown in the example of FIG. 5, the participants in the online negotiation exchange messages that enable them to determine the priorities they should associate with the colliding instant messages to John Smith. The online negotiation shown in FIG. 5 results in a determination by the participants that the instant message sent by Martha Blogger is the most important of the colliding messages, and accordingly Martha Blogger states that she will associate a high priority (e.g. click on button 72A) with her message. John Deere and Glen Davis agree to associate a low priority (e.g. click on button 72B) with their messages, and Joe Blogs agrees to cancel his message for the time being (e.g. click on button 72C). In response to the user entered indications of message priority, the embodiment of the disclosed system shown in FIG. 5 operates, for example, to automatically deliver Martha Blogger's message to John Smith next. After allowing in someway for John Smith to process Martha Blogger's message, the disclosed system then automatically delivers one of the low priority messages of John Deere and Glen Davis. For example, the disclosed system may refer to an external priority information database to determine that messages from John Deere are to be delivered to John Smith before messages from Glen Davis, and accordingly select John Deere's message for delivery prior to delivery of Glen Davis' message. Then, after allowing for John Smith to have processed the message from John Deere, the disclosed system automatically sends the message from Glen Davis to John Smith. Because he has withdrawn his message, Joe Bloggs is responsible for sending his message to John Smith at a later time. In one embodiment, the disclosed system operates to subsequently notify Joe Bloggs (e.g. by sending him an instant message, email message, etc.), after all the other negotiation participants have successfully had their message delivered to John Smith or have withdrawn their messages, so that Joe Bloggs can then retry sending his message to John Smith at a time when there is no collision.

The disclosed system provides many advantages over previous systems. For example, in a large organization, when a senior manager logs onto the instant messaging system, many of his or her reports are likely to immediately want to send him or her an instant message. Using previous systems, there was no way for the manager to allow the message senders to sort out which of them had the most pressing need to communicate with him or her. With the disclosed system, the manager only receives a next instant message after the sending users of the colliding instant messages have negotiated online to determine which of them should be the next one to communicate with the manager. The advantages in this regard are not limited to business managers, but apply generally to any instant messaging system user that at times may be sent multiple instant messages at the same time.

Additionally, the advantages of the disclosed system are enhanced through dividing up sending users of colliding instant messages into multiple online negotiations based on the group memberships of the sending users. Such group memberships may, for example, be determined from an organization hierarchy represented in an external database, such as an LDAP directory or the like. Group membership may further be determined based on any appropriate sending user attributes that may be accessed by or integrated into the disclosed system, such as social networking attributes relating to the receiving user's social networks (e.g. a high priority group could consist of members of the receiving user's Buddy List), message delivery prioritization rules defined by the receiving user and/or a system administrator, or policies implemented across a business organization to which the receiving user belongs.

For example, when a senior executive logs into the instant messaging system, a number of colliding messages may be sent to them including messages from 1) three users belonging to the human resources department regarding a recent hiring decision, and 2) four users in the manufacturing group to discuss third shift polices. Using the disclosed system, the three sending users in the human resources department would be made participants in a first online negotiation to determine who among them should go first, and the four sending users in manufacturing would be made participants in a second, separate online negotiation to determine who among them should go first. The disclosed system would then operate to obtain outputs from the two online negotiations indicating the next message to be sent from the human resources group and the next message to be sent from manufacturing, and then select one of those two messages to deliver to the receiving user, based on a predetermined prioritization given to one of the two groups over the other, based on the first negotiation to have completed, or based on some other criteria.

In another use case, an executive is working with an acquisition team on a new acquisition. Since the members of the acquisition team need rapid access to the executive during the acquisition process, the executive can configure the disclosed system to allow all instant messages sent by members of the acquisition team to be delivered immediately even when they collide with other messages. As a result, in the event that messages sent by acquisition team members collide with messages sent by members of the manufacturing organization, the online negotiation would be initiated having as participants only those sending users from manufacturing, while the messages from the acquisition team members would be delivered immediately regardless of the fact that they were part of a message collision.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method, performed by a computer system, for delivering instant messages, comprising:
   detecting a collision between a plurality of instant messages simultaneously being sent to a receiving user;
   initiating, responsive to said detecting of said collision, an online negotiation between sending users of said plurality of messages simultaneously being sent to said receiving user, wherein said initiating said online negotiation comprises automatically starting at least one group chat session including as participants all of said sending users of said plurality of messages simultaneously being sent to said receiving user and displaying to each participant in said group chat session an indication that their associated instant message to said receiving user has collided with the other messages in said plurality of messages;
   detecting a result of said online negotiation between said sending users of said plurality of messages, said result of said online negotiation indicating a highest priority one of said plurality of instant messages simultaneously being sent to said receiving user; and
   delivering, responsive to said result of said online negotiation between said sending users of said plurality of messages, said highest priority one of said plurality of instant messages simultaneously being sent to said receiving user, such that delivery of said highest priority one of said plurality of instant messages simultaneously being sent to said receiving user is ensured to be prior to delivery of any other one of said plurality of instant messages simultaneously being sent to said receiving user.

2. The method of claim 1, further comprising:
   detecting that said receiving user has processed said highest priority one of said plurality of instant messages simultaneously being sent to said receiving user; and
   delaying delivery of said plurality of instant messages simultaneously being sent to said receiving user other than said highest priority one until after said detecting that said receiving user has processed said highest priority one of said plurality of instant messages.

3. The method of claim 2, further comprising:
   wherein said detecting said receiving user has processed said highest priority one of said plurality of instant messages simultaneously being sent to said receiving user comprises detecting that said receiving user has sent an instant message to a sending user of said highest priority one of said plurality of instant messages in response to said highest priority one of said plurality of instant messages.

4. The method of claim 1, further comprising:
   displaying to each of said participants in said group chat session at least one graphical object that enables setting a relative priority to be associated with their associated message.

5. The method of claim 4, further comprising:
   wherein said at least one graphical object includes a graphical button that enables each of said participants to set a relatively lower priority to be associated with their associated message.

6. The method claim 4, further comprising:
   wherein said at least one graphical object includes a graphical button that enables each of said participants to withdraw their associated message from said online negotiation.

7. The method of claim 6, further comprising:
   wherein said detecting said collision between said plurality of instant messages simultaneously being sent to said receiving user comprises detecting that each of said sending users has selected said receiving user as a message recipient for an instant message currently being created.

8. The method of claim 6, further comprising:
   wherein said detecting said collision between said plurality of instant messages simultaneously being sent to said receiving user comprises detecting that each of said plurality of instant messages were sent by their associated sending users within a predetermined time period.

9. The method of claim 6, further comprising:
   wherein said highest priority one of said plurality of instant messages simultaneously being sent to said receiving user is determined further responsive to at least one external database.

10. The method of claim 9, further comprising:
    wherein said external database indicates relative priorities between said senders of said plurality of instant messages.

11. The method of claim 10, further comprising:
wherein said external database indicates groups associated with said senders of said plurality of instant messages; and
wherein said external database indicates relative priorities between said groups.

12. The method of claim 11, further comprising:
wherein said initiating said online negotiation comprises automatically starting a plurality of group chat sessions, each one of said plurality of group chat sessions including as participants those of said sending users associated with a corresponding one of said groups indicated by said external database.

13. The method of claim 12, further comprising:
wherein said detecting said result of said online negotiation between said sending users of said plurality of messages includes detecting a result of each one of said plurality of group chat sessions indicating a highest priority instant message associated with that one of said plurality of group chat sessions; and
wherein said highest priority one of said plurality of instant messages comprises a highest priority instant message associated with one of said plurality of group chat sessions associated with a highest priority one of said groups indicated by said external database.

14. A computer system, comprising:
at least one computer readable memory, said computer readable memory having program code stored thereon, said program code comprising
  program code for detecting a collision between a plurality of instant messages simultaneously being sent to a receiving user,
  program code for initiating, responsive to said detecting of said collision, an online negotiation between sending users of said plurality of messages simultaneously being sent to said receiving user, wherein said initiating said online negotiation comprises automatically starting at least one group chat session including as participants all of said sending users of said plurality of messages simultaneously being sent to said receiving user and displaying to each participant in said group chat session an indication that their associated instant message to said receiving user has collided with the other messages in said plurality of messages,
  program code for detecting a result of said online negotiation between said sending users of said plurality of messages, said result of said online negotiation indicating a highest priority one of said plurality of instant messages simultaneously being sent to said receiving user, and
  program code for delivering, responsive to said result of said online negotiation between said sending users of said plurality of messages, said highest priority one of said plurality of instant messages simultaneously being sent to said receiving user, such that delivery of said highest priority one of said plurality of instant messages simultaneously being sent to said receiving user is ensured to be prior to delivery of any other one of said plurality of instant messages simultaneously being sent to said receiving user.

15. A computer program product, comprising:
a computer readable memory, said computer readable memory having program code stored thereon, said program code comprising
  program code for detecting a collision between a plurality of instant messages simultaneously being sent to a receiving user,
  program code for initiating, responsive to said detecting of said collision, an online negotiation between sending users of said plurality of messages simultaneously being sent to said receiving user, wherein said initiating said online negotiation comprises automatically starting at least one group chat session including as participants all of said sending users of said plurality of messages simultaneously being sent to said receiving user and displaying to each participant in said group chat session an indication that their associated instant message to said receiving user has collided with the other messages in said plurality of messages,
  program code for detecting a result of said online negotiation between said sending users of said plurality of messages, said result of said online negotiation indicating a highest priority one of said plurality of instant messages simultaneously being sent to said receiving user, and
  program code for delivering, responsive to said result of said online negotiation between said sending users of said plurality of messages, said highest priority one of said plurality of instant messages simultaneously being sent to said receiving user, such that delivery of said highest priority one of said plurality of instant messages simultaneously being sent to said receiving user is ensured to be prior to delivery of any other one of said plurality of instant messages simultaneously being sent to said receiving user.

16. A system for delivering instant messages, comprising:
means for detecting a collision between a plurality of instant messages simultaneously being sent to a receiving user;
means for initiating, responsive to said detecting of said collision, an online negotiation between sending users of said plurality of messages simultaneously being sent to said receiving user, wherein said initiating said online negotiation comprises automatically starting at least one group chat session including as participants all of said sending users of said plurality of messages simultaneously being sent to said receiving user and displaying to each participant in said group chat session an indication that their associated instant message to said receiving user has collided with the other messages in said plurality of messages;
means for detecting a result of said online negotiation between said sending users of said plurality of messages, said result of said online negotiation indicating a highest priority one of said plurality of instant messages simultaneously being sent to said receiving user; and
means for delivering, responsive to said result of said online negotiation between said sending users of said plurality of messages, said highest priority one of said plurality of instant messages simultaneously being sent to said receiving user, such that delivery of said highest priority one of said plurality of instant messages simultaneously being sent to said receiving user is ensured to be prior to delivery of any other one of said plurality of instant messages simultaneously being sent to said receiving user.

* * * * *